United States Patent [19]

Nagasawa et al.

[11] Patent Number: 4,777,546
[45] Date of Patent: Oct. 11, 1988

[54] CASSETTE-TYPE MAGNETIC TAPE RECORDING AND/OR REPRODUCING APPARATUS WITH SINGLE MOTOR FOR TAPE LOADING AND UNLOADING AND FOR PINCH ROLLER ACTUATION

[75] Inventors: Tsuyoshi Nagasawa, Tokyo; Yoshinori Yamamoto, Kanagawa; Masao Ohyama; Yutaka Fukuyama, both of Tokyo, all of Japan

[73] Assignee: Sony Corporation, Tokyo, Japan

[21] Appl. No.: 854,585

[22] Filed: Apr. 22, 1986

[30] Foreign Application Priority Data

May 30, 1984 [JP] Japan .................. 59-108552

[51] Int. Cl.4 ............................... G11B 5/027
[52] U.S. Cl. ........................................ 360/85
[58] Field of Search .................... 360/85, 95

[56] References Cited

U.S. PATENT DOCUMENTS

| | | | |
|---|---|---|---|
| 4,481,551 | 11/1984 | Maeda | 360/85 |
| 4,561,029 | 12/1985 | Maeda | 360/85 |
| 4,566,047 | 1/1986 | Hirose et al. | 360/85 |
| 4,611,251 | 9/1987 | Yokoo | 360/85 |

Primary Examiner—Robert S. Tupper
Assistant Examiner—Melissa J. Koval
Attorney, Agent, or Firm—Lewis H. Eslinger

[57] ABSTRACT

A cassette-type magnetic tape recording and/or reproducing apparatus is comprised of a rotary drum unit having a magnetic head or heads for recording or reproducing signals on a magnetic tape, a loading device movable between a first position and a second position by the operation of a single electric motor, a tape guide device responsive to movement of the loading device to extract the tape from a cassette and to guide the tape by being moved between an inoperative position and an operative position in which a preset tape path is defined in proximity to the drum device, and a pinch roller operating device also associated with the loading device for pressing the pinch roller against the capstan or disengaging the pinch roller from the capstan.

5 Claims, 8 Drawing Sheets

CASSETTE-TYPE MAGNETIC TAPE RECORDING AND/OR REPRODUCING APPARATUS WITH SINGLE MOTOR FOR TAPE LOADING AND UNLOADING AND FOR PINCH ROLLER ACTUATION

RELATED APPLICATION

This application is a continuation of our co-pending U.S. patent application Ser. No. 739,287, filed May 30, 1985.

BACKGROUND OF THE INVENTION

1. Field of the Invention

This invention relates to a magnetic recording and reproducing apparatus provided with a magnetic tape loading device, and more particularly is directed to a video tape recorder of the so-called helical scanning type used for audio recording with the pulse code modulation (PCM) system.

2. Description of the Prior Art

A conventional helical scan, cassette-type magnetic tape recording and reproducing apparatus has a tape guide drum mounted on the chassis of a magnetic head unit which includes a rotary magnetic head or heads mounted coaxially with the drum, and the magnetic tape is guided in an inclined path about the outer periphery of the drum so that the rotary magnetic head or heads operating at a high rpm, trace inclined or skewed tracks on the tape for recording and/or reproducing information signals in such tracks.

Such magnetic recording and reproducing apparatus is provided with a loading unit whereby the magnetic tape is extracted from a tape cassette mounted in an operative position within the recording or reproducing apparatus and is wrapped about the outer periphery of the drum. The loading unit is comprised of rotary members, such as loading rings, provided with loading blocks in turn equipped with deflection guide or inclined guide members for the magnetic tape. By the controlled rotation of these rotary members, the guide members of the loading unit may be transferred from inside the tape cassette to loading end positions in the vicinity of the tape guide drum.

The conventional recording or reproducing apparatus is also provided with a control electric motor for driving the rotary members and a switch for detecting the position of the loading blocks. Further, the magnetic recording or reproducing apparatus is provided with a pinch roller control unit for establishing or releasing pressure contact between the capstan and the pinch roller. The pinch roller control unit has the pinch roller mounted at one end of a supporting arm the other end of which is pivotally supported. The pinch roller is pressed against the capstan with the tape interposed therebetween in response to angular displacement of the supporting arm by, for instance, a solenoid plunger. In addition, the apparatus is designed so that the constant speed running of the magnetic tape may take place while the pinch roller is in pressure contact with the capstan (pinch ON state) and the tape stop (STOP), rewind (REW) or fast feed (FF) may take place while the pinch roller is released from pressure contact with the capstan (pinch OFF state).

When the loading unit and the pinch roller control unit are constructed as separate units, as in the above described conventional cassette-type magnetic tape recording or reproducing apparatus, separate driving sources are required for the loading and the pinch roller control units, resulting in an increased number of component parts and a complicated structure for the recording or reproducing apparatus. Further, the assembling operation is complicated and the apparatus can be made small and compact only with considerable difficulties. In addition, when the loading block and the pinch roller are driven by separate driving units, the chances of troubles or malfunctions are enhanced because of the independent manner of operation of the driving units, with the result that operational reliability is necessarily lowered.

OBJECTS AND SUMMARY OF THE INVENTION

It is therefore a principal object of the present invention to provide a cassette-type magnetic tape recording or reproducing apparatus wherein the necessity of providing complicated driving sources for driving the loading blocks and the pinch roller is eliminated in such a manner that the number of component parts is reduced and the assembling of the apparatus is facilitated.

It is another object of the present invention to provide a cassette-type magnetic tape recording and reproducing apparatus wherein the engagement of the pinch roller with the capstan and the release thereof are controlled by a single control motor which also controls the tape loading for providing a more coordinated operation in such a manner that the chance of troubles or malfunctions occurring is reduced while the operational reliability is improved.

The above, and other objects of the present invention, will become apparent from reading the following detailed description of a preferred embodiment of the invention in conjunction with the accompanying drawings.

DESCRIPTION OF A PREFERRED EMBODIMENT

A magnetic recording or reproducing apparatus according to a preferred embodiment of the present invention is hereinafter described in detail with reference to the accompanying drawings.

Figure 1:
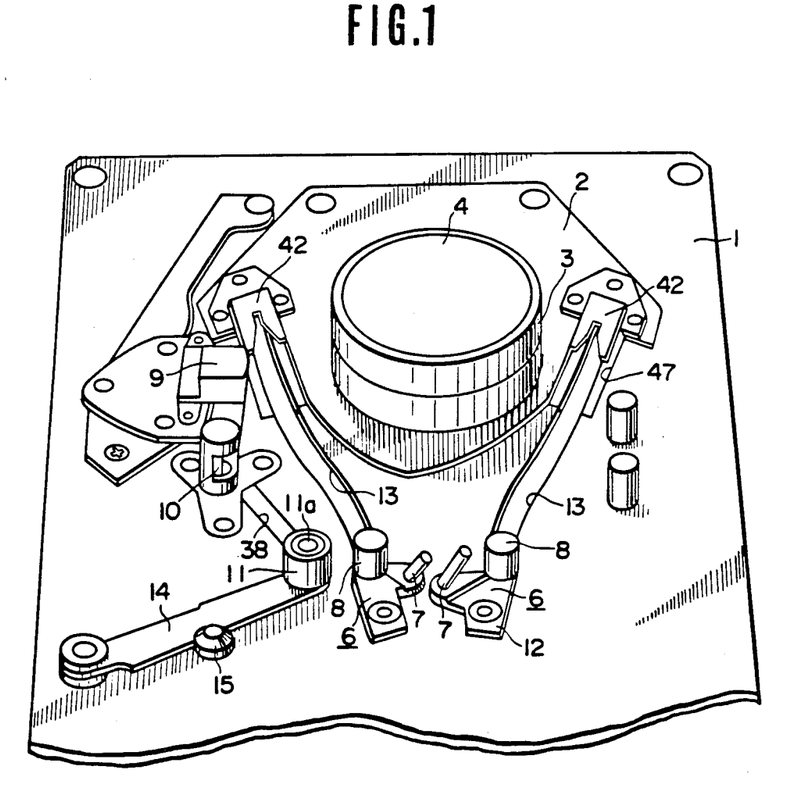
FIG. 1 is a perspective view showing essential parts of a cassette-type magnetic tape recording or reproducing apparatus according to an embodiment of the present invention, and which is shown with a portion thereof being cut away.
Figure 2:
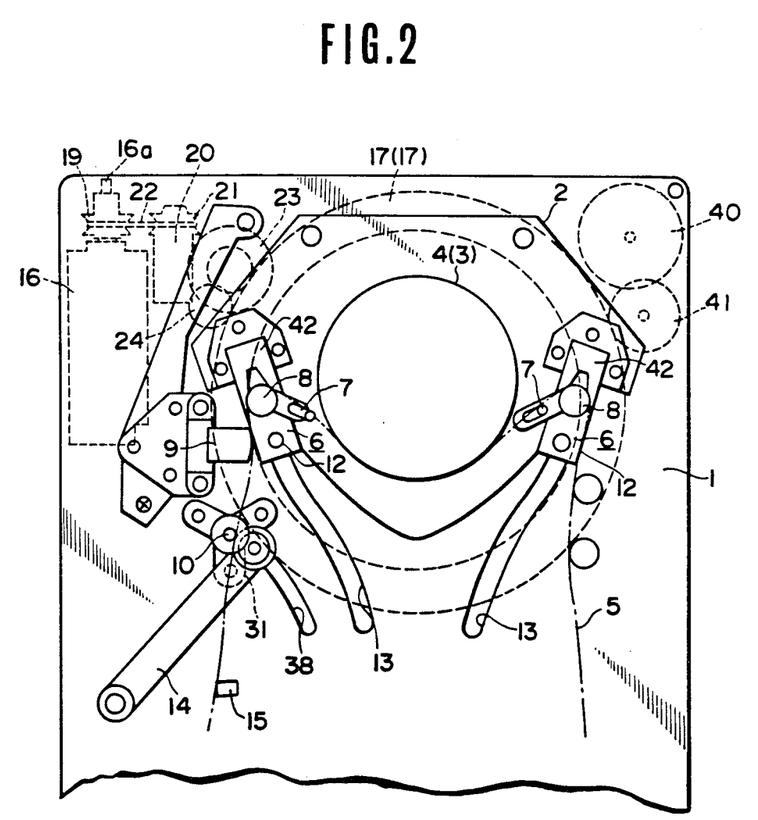
FIG. 2 is a schematic plan view showing the recording or reproducing apparatus of FIG. 1 but in an operative position.
Figure 3:
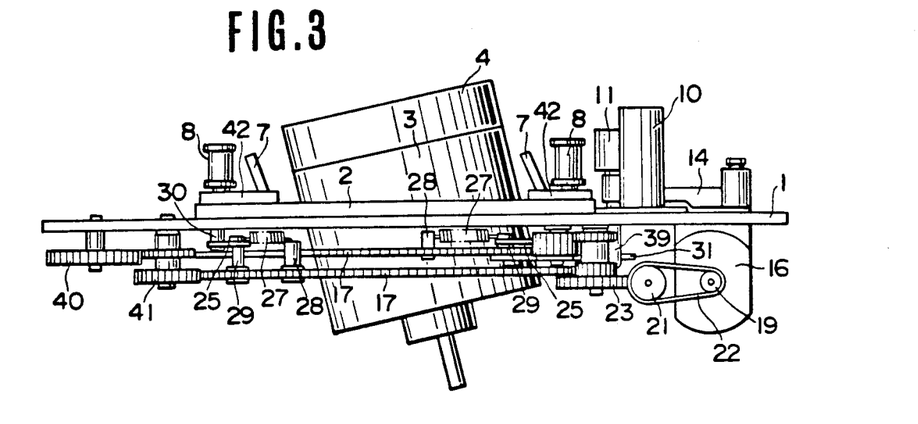
FIG. 3 is a schematic elevational view of the apparatus shown in FIG. 1.

Referring initially to FIGS. 1-2, it will be seen that the magnetic recording or reproducing apparatus thus illustrated is of the so-called helical scanning type and includes a fixed drum 3 mounted on a drum mounting base plate 2 provided on a chassis 1, and a rotary drum 4 mounted above the fixed drum 3. Signals are recorded on or reproduced from a magnetic tape 5 wrapped about drums 3,4 by a rotary magnetic head or heads, not shown, of a magnetic head unit provided on rotary drum 4. The drum mounting base plate 2 is mounted on chassis 1 in a manner to permit fine adjustment of the height and mounting angle of the mounting base with respect to chassis 1, while the drums 3,4, mounted with the common axes thereof tilted in respect to drum mounting base plate 2, as shown in FIG. 3, are suitably mounted to permit fine adjustment of the height and mounting angle of the drums 3,4, with respect to the chassis 1. The magnetic tape 5 is wrapped about 90 degrees about the drums 3,4 as it is guided by inclined guide members, 7,7 and deflection guide members 8,8 of two respective tape guide assemblies 6,6 making up a loading unit. On the chassis 1 are mounted a head assembly 9 provided with an erasure head and a control head, and a capstan 10 against which a pinch roller 11 is adapted to be pressed with the magnetic tape 5 interposed between the capstan and the pinch roller. Rotation of the drum 4 cause rotary movement of the rotary magnetic head or heads for forming recording tracks on the magnetic tape 5 in such a manner that the information is recorded on or reproduced from the magnetic tape 5 according to, for example, the pulse code modulation (PCM) system. To this end, the tape 5 wound about the drum periphery as described above is driven or made to travel longitudinally as it is guided by capstan 10, pinch roller 11 and guide members 7,8.

The magnetic recording or reproducing apparatus is designed so that the magnetic tape 5 is extracted from a tape cassette, not shown, by the tape guide assemblies 6,6, so as to be loaded about the outer periphery of drums 3,4. Each tape guide assembly 6 is provided with a guide base member 12 movable on the chassis 1. On each guide base member 12 are mounted the respective inclined guide member 7 and the upright deflection guide member 8. The upper and bottom sides of the guide base members 12 are formed in part with flat positioning surfaces and the guide members 7,8 are mounted so as to permit fine adjustment of the mounting angles thereof with respect to these flat surfaces. The tape guide assemblies 6,6 arranged in the manner described above are movable along a pair of respective guide slots 13,13 extending through the chassis 1 and shaped in such a manner that the guide assemblies 6 are transferred from first positions (FIG. 1) inside the tape cassette to loading or second positions (FIG. 2) adjacent to drums 3,4.

The pinch roller 11 is rotatably mounted on one end of a supporting arm 14 the other end of which is mounted for free rotation or pivoting on the chassis 1 so that pinch roller 11 may be brought into or be released from pressure contact with capstan 10. The other or pivoted end of supporting arm 14 is associated with a return spring (not shown) by which pinch roller 11 is urged in a direction away from capstan 10. The supporting arm 14 is limited in its movement away from capstan 10 by a stopper 15 provided to the chassis 1 so supporting arm 14 may be held in a predetermined position (FIG. 1) by the force of the return spring.

Figure 4:
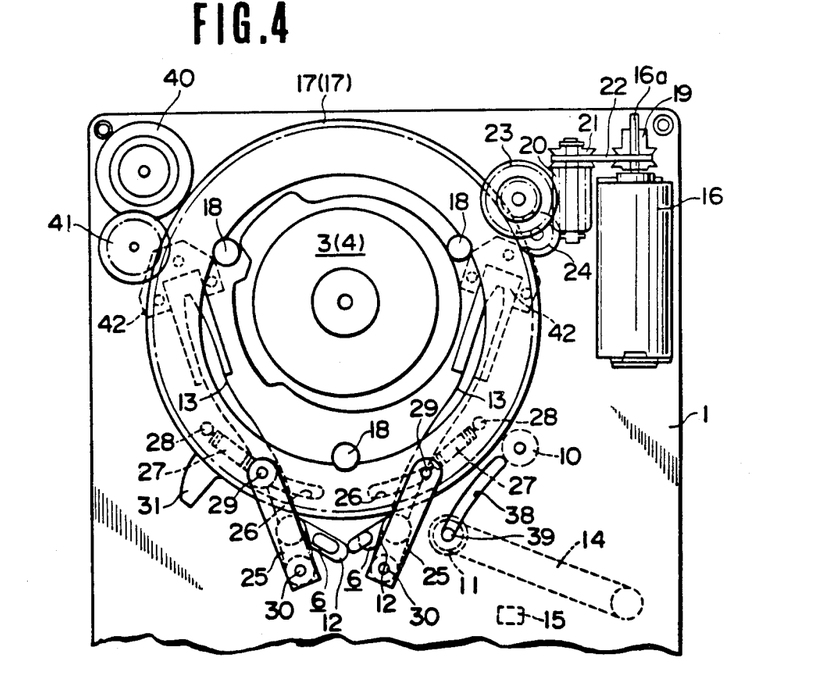
FIG. 4 is a schematic bottom view of the apparatus shown in FIG. 1.
Figure 5:
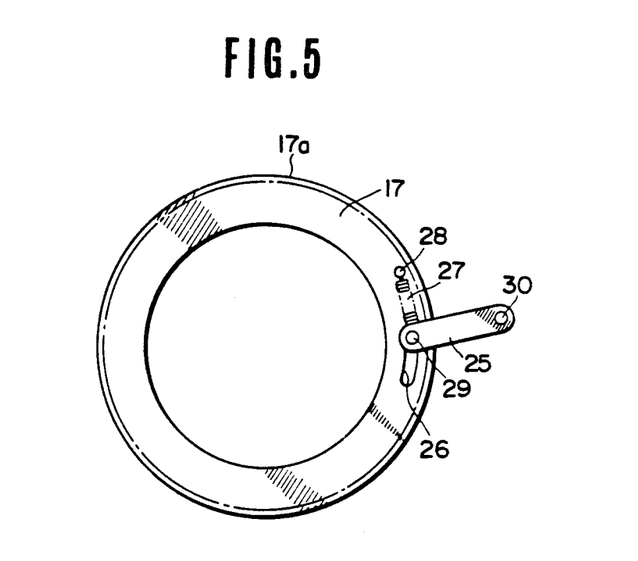
FIG. 5 is a plan view of one of the rotary members employed in the apparatus shown in FIG. 1.

In the magnetic recording or reproducing apparatus, there are provided, at the under side of chassis 1, a pair of rotary members 17,17 and a single, reversible control motor 16, as shown in FIG. 4. The control motor 16 is designed to control the operations of pinch roller 11 and the tape guide assemblies 6,6.

The rotary members 17,17 are in the form of superimposed flat rings and are adapted to be turned in mutually opposite directions independently of each other. To this end, the rotary members 17,17 are slidably engaged, at the inner peripheries thereof, in mating grooves provided in, for example, three guide elements 18, which are, in turn, mounted in a depending manner from the underside of chassis 1. The outer peripheries of these rotary members 17,17 are formed with tooth racks 17a,17a, respectively.

The electric control motor 16 is arranged at one side of rotary members 17,17 and has its driving shaft 16a fixed to a drive pulley 19. At the side of control motor 16 facing toward rotary members 17,17 there is rotatably mounted a worm gear 20 in parallel with the driving shaft 16a. At on end of worm gear 20 there is integrally mounted a pulley 21 and a transmission belt 22, such as, a rubber belt, extends around pulley 21 and drive pulley 19 attached to driving shaft 16a. In this manner, worm gear 20 can be turned in either direction in response to corresponding operation of control motor 16.

The tooth rack 17a of one of the rotary members 17 is driven from worm gear 20 via a worm wheel 23, whereas the tooth rack 17a of the other rotary member 17 is driven from worm gear 20 via the worm wheel 23 and an idler gear 24. Therefore, the rotary members 17,17 are rotated in mutually opposite directions by the rotation of worm gear 20 which is caused by the operation of control motor 16.

Figure 6:
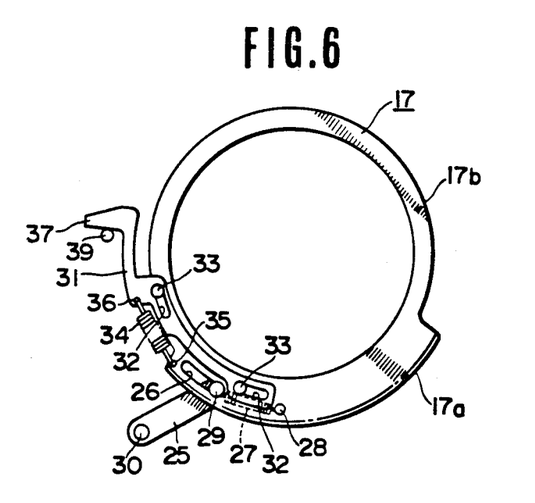
FIG. 6 is a plan view showing the other rotary member employed in the apparatus shown in FIG. 1.
Figure 7:
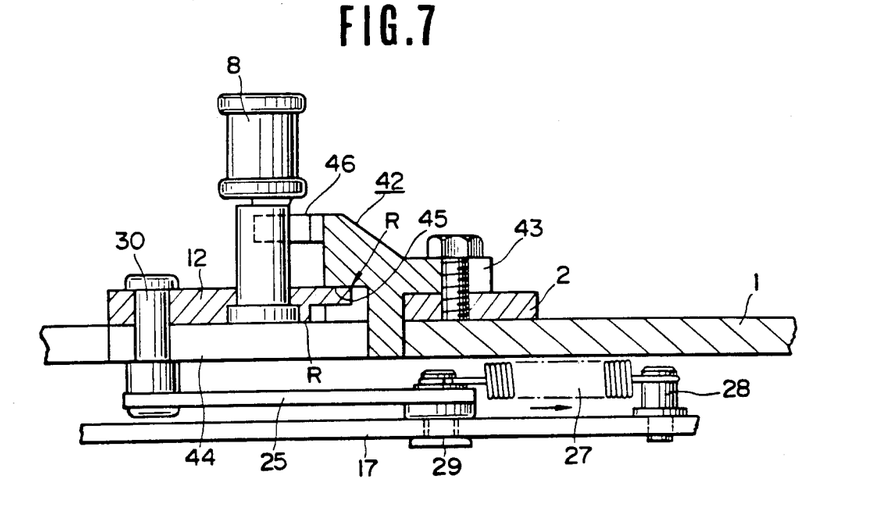
FIG. 7 is an enlarged sectional view of a supporting structure for a tape guide assembling included in the apparatus of FIG. 1, with a portion thereof being omitted.

The one of the rotary members which is situated closest to chassis 1 is provided with a circumferential cut-out 17b (FIG. 6) through which the other of the rotary members 17 is partially exposed to the underside of the chassis 1. In portions of the rotary members 17,17 that are facing or exposed toward chassis 1 are provided a pair of elongated through-holes 26 slidably receiving pins 29 on which are mounted a pair of loading arms 25 each carrying one of the guide assemblies 6,6. To the exposed portions of the rotary members 17,17 are also attached limiting springs, such as coil springs 27, adapted for acting on the loading arms 25. The through-holes 26,26 are extended along the circumference of the rotary members 17,17, and each of the limiting springs 27,27 is connected, at one end, to an anchor or projection 28 spaced circumferentially from the respective elongated slot 26. As shown on FIG. 7, the one end of each loading arm 25 is mounted on the respective pin 29 slidably engaged in the elongated slot 26 so that the loading arm is movable along the slot 26 relative to the respective rotary member 17. The other end of each of the limiting springs 27,27 is secured to the respective pin 29. To the other ends of the loading arms 25,25 are attached a pair of erect shafts 30,30 that are inserted through the guide slots 13 of the chassis 1 and that are projecting towards the upper surface of the chassis 1. To these shafts 30 are attached the base members 12 of tape guide assemblies 6,6.

The uppermost rotary member 17 also has mounted thereon a pinch roller operating lever 31 for pressing the pinch roller 11 against the capstan 10. The base part of the operating lever 31 is formed with a pair of elongated through-holes 32 into which are slidably fitted a pair of engaging projections or pins 33,33 provided on the respective rotary member 17. In this manner, the operating lever 31 is guided by these engaging projections 33,33 so as to be movable along the through-holes 32,32. Further, one end of a limiting spring 34 is engaged in a hole 36 in pinch roller operating lever 31 and other end of the limiting spring 34 is retained in an engaging through-hole 35 in the respective rotary member 17 (FIG. 6) so that the operating lever 31 is urged in the circumferentially forward direction relative to the respective rotary member 17. The foremost part of the pinch roller operating lever 31 is bent into an L-shaped engaging portion 37.

The supporting arm 14 rotatably carrying pinch roller 11 is provided with downward extending projection 39 coaxial with a supporting shaft 11a of the pinch roller 11.

The projection 39 is slidably extended through a guide slot 38 formed in the chassis 1 for guiding the pinch roller 11 (FIG. 4) and projects below chassis 1. The lower end of projection 39 is engageable with the foremost engaging portion 37 of pinch roller operating lever 31 (FIG. 6) in such a manner that, with the movement of the pinch roller operating lever 31 caused by the rotation of the associated rotary member 17, supporting arm 14 is moved along the guide slot 38 against the resiliency of the return spring. The mounting position of pinch roller operating lever 31 is selected so that, as the loading assemblies 6,6 are moved towards a preset loading position by the rotation of the rotary members 17,17, projection 39 is engaged with the foremost portion 37 for shifting the pinch roller 11 and, when the tape guide assemblies 6,6 have been shifted to the preset loading position, as the rotary members 17,17 are rotated further, pinch roller 11 is brought into pressure abutment with capstan 10.

At the underside of the chassis 1, there is provided a rotary encoder 40 for sensing the rotary position of the rotary members 17,17 and correspondingly controlling the operation of control motor 16. The rotary encoder 40 meshes with the tooth rack 17 a of one of the rotary members 17 by way of an idle pinion 41 so as to be rotated with rotation of the respective rotary member 17. On the outer periphery of the rotary encoder 40 is formed a pattern of circumferentially alternated black and white indicia, (not shown). The number and direction of these indicia moving past a photocoupler (not shown), for example, consisting of a combination of light emitting diodes and photo-transistors, are detected during the rotation of encoder 40 and hence indicate the rotary position of the rotary members 17,17.

The magnetic recording and reproducing apparatus is further provided with control blocks 42,42 (FIGS. 4,8 and 9) for positioning and holding the tape guide assemblies 6,6 in the preset loading position. These control blocks 42,42 are secured to the drum mounting base plate 2 at opposite sides of the drums 3,4.

Figure 8:
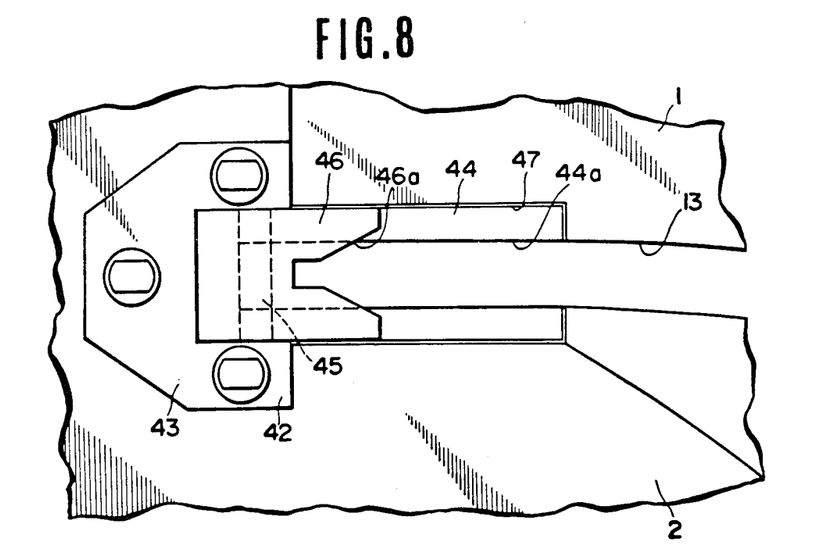
FIG. 8 is a plan view showing a control block employed in the apparatus of FIG. 1.
Figure 9:
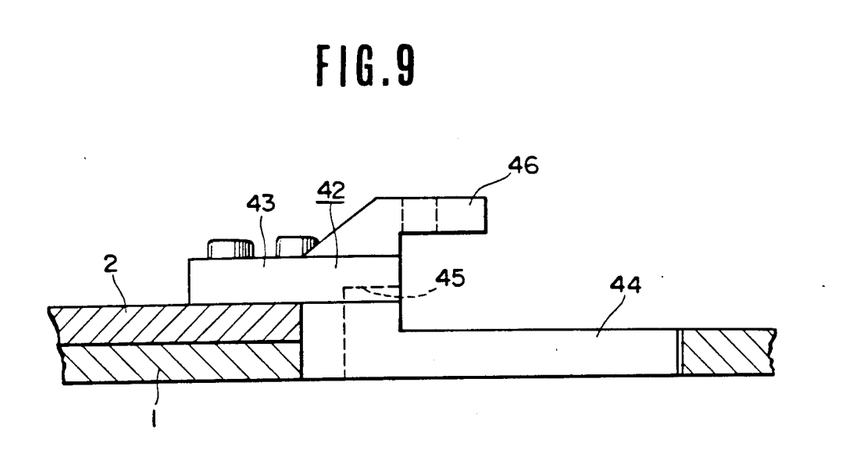
FIG. 9 is a side view of the control block of FIG. 8, with a portion being cut away.
Figure 10:
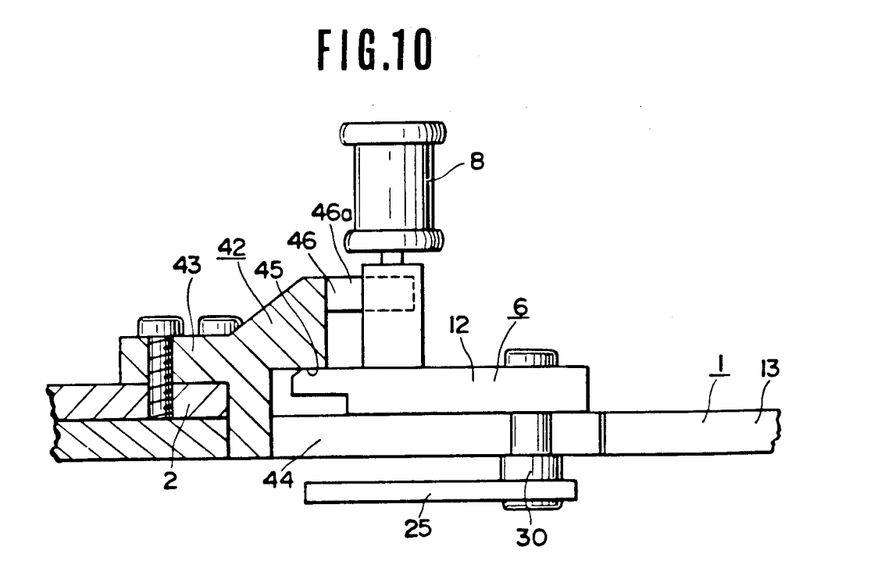
FIG. 10 is a side view illustrating the cooperation of a tape guide assembly with the control block, and with a portion being cut away.

As shown particularly on FIGS. 8 and 9, each control block 42 is integrally formed of a mounting piece 43 threadably mounted to the drum mounting base plate 2, a slide piece 44 for controlling the flat bottom surface of the guide base member 12 of the associated tape guide assembly 6, a slide step 45 for controlling the upper flat surface of the respective guide base member 12 and a control piece 46 for receiving the deflection guide member 8 of the associated tape guide assembly 6 and controlling the shifted position of the tape guide assembly 6. The elements 43 to 46 of each control block 42 may be formed integrally, as by molding synthetic resin or machining a single metallic blank. The slide piece 44 is disposed within a cut-out 47 formed in the chassis as an extension of the respective guide slot 13 and has a cut-out 44a constituting a continuation of the guide slot 13. A noted above, the upper surface of the slide piece 44 is formed as a slide guide surface for positioning the flat bottom surface of the guide base member 12, and for that purpose said guide surface is flush with the upper surface of chassis 1. The slide step 45 is formed in opposition to the base part of the slide piece 44 with the surface of the slide step 45 opposed to the base part of the slide piece 44 acting as another slide guide surface for positioning the upper flat surface of the guide base member 12. In this manner, the guide base member 12 of each tape guide assembly 6, in proceeding towards the control block 42, is sandwiched, at the upper and lower sides thereof, between the slide pieces 44 and the slide step 45, as shown in FIG. 10, for accurately regulating the vertical position of the tape guide assembly 6 with respect to drums 3,4.

The control piece 46 is projected towards the foremost part of the slide piece 44 in parallel with the slide guide surfaces and is formed with a control vee-groove 46a for receiving the outer periphery of the associated deflection guide member 8. For ensuring that the guide member 8 is received correctly and without tilting, the foremost abutment sides of control groove 46a are formed so as to be transversely symmetrical to each other and perpendicular to the aforementioned slide guide surface.

The slide piece 44, slide step 45, control piece 46 and the mounting piece 43 of each control block 42 are formed integrally with a high dimensional accuracy and are so designed that, when the mounting piece 43 is attached, for example, by three set screws, to the reference surface of drum mounting base plate 2, the elements 43 to 46 can be positioned accurately relative to the drums 3,4, and, as a result thereof, the tape guide assemblies 6,6 can be positioned and held in the proper loading positions with respect to drums 3,4.

Figure 11:
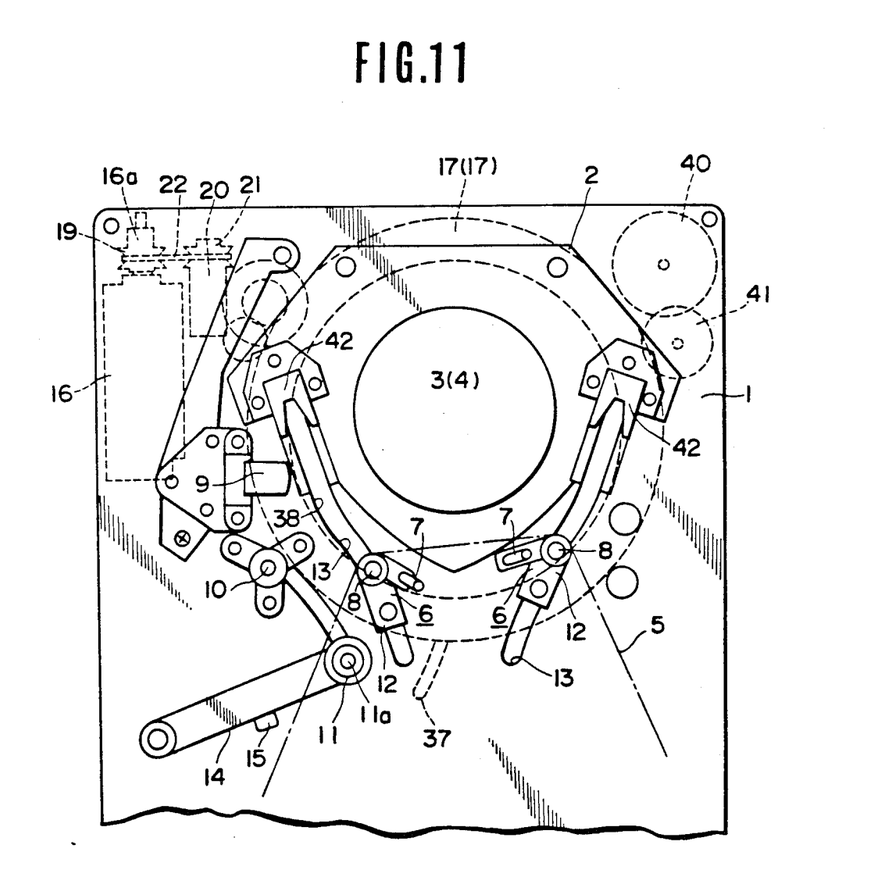
FIG. 11 is a plan view showing an intermediate phase of the tape loading operation of the apparatus shown in FIG. 1.
Figure 12:
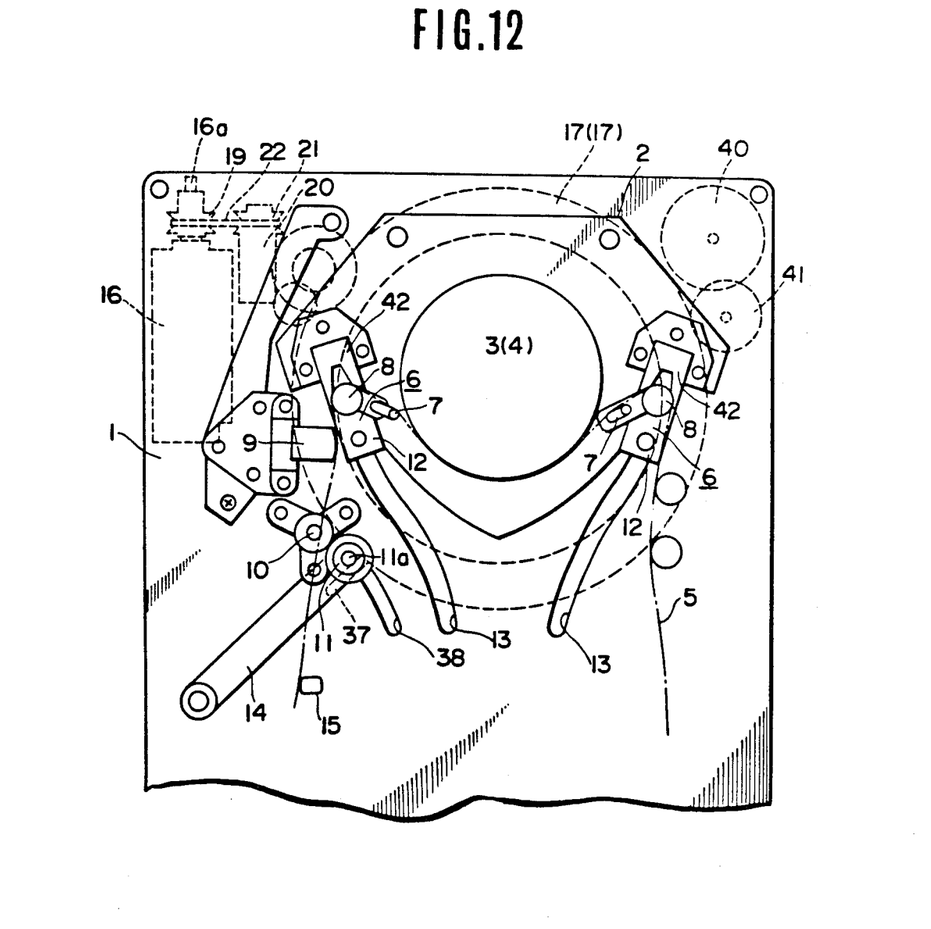
FIG. 12 is a plan view showing the end of the tape loading operation of the apparatus shown in FIG. 1.

When the magnetic tape 5 accommodated in a tape cassette is to be loaded or wrapped about the drums 3,4 of the above described magnetic recording or reproducing apparatus, the control motor 16 is rotated in a forward direction for causing rotation of rotary members 17,17 in mutually opposite directions. The loading arms 25,25 are shifted in response to the rotation of rotary members 17,17 under the traction of the associated limiting springs 27,27 so that tape guide assemblies 6,6 are shifted from inside the tape cassette towards control blocks 42,42 along guide slots 13,13 as shown in FIG. 11, with the tape 5 being engaged at all times by the tape guide assemblies 6,6. When the deflection guide members 8,8 of tape guide assemblies 6,6 are received by the control grooves 46a,46a of control blocks 42,42, the movements of the tape guide assemblies 6,6 cease. At this time, the tape 5 is wound approximately 90° about the outer periphery of the drums 3,4. Further, at such time, the guide base members 12,12 are positioned by the slide guide surfaces of control blocks 42,42, and the deflection guide members 8,8 are positioned by the control grooves 46a,46a, so that the deflection guide members 8,8 and the inclined guide members 7,7 are brought to and held at the proper positions and tilting angles.

After the tape guide assemblies 6,6 are brought to a stop, as above, control motor 16 is further driven until rotary members 17,17 are turned further by a preset angle, and during such further turning springs 27,27 are tensioned or expanded. At such time, the operation of control motor 16 ceases, and spring tension of limiting springs 27,27 expanded in this manner is applied to the tape guide assemblies 6,6 so that the tape guide assemblies 6,6 are securely held with a stable pressure contact against the cocntrol blocks 42.

As the tape guide assemblies 6,6 are moved in the above described manner, the engaging foremost part 37 of the pinch roller operating lever 31 on one of rotary members 17 is engaged with the projection 39 of the supporting arm 14, thus initiating the movement of the pinch roller 11 toward capstan 10. When the tape guide assemblies 6,6 are moved into pressure contact with the control blocks 42,42, pinch roller 11 has been shifted to a pinch OFF position, that is, to a position slightly spaced apart from the capstan 10. With the pinch roller 11 in such OFF position, take-up or supply reels (not shown) are suitably driven for performing various operations, such as fast-forward (FF), rewind (REW), or stop (STOP) of the magnetic tape 5.

When the control motor 16 is driven further forward, the rotary members 17,17 are further turned until pinch roller 11 abuts against the capstan 10 with the magnetic tape 5 therebetween. The control motor 16 is then driven further to advance the rotary member 17 connected to operating lever 31 a preset angle for applying the tension of the limiting spring 34 to the pinch roller 11 so that pinch roller 11 and capstan 10 are held in abutment or pinch ON position. In this state, the magnetic tape 5 is properly guided and caused to run at a constant speed to permit signal recording or reproduction as desired.

The control motor 16 may be driven in the reverse direction, starting from the pinch ON state, so that pinch roller 11 is released from pressure contact with and spaced apart from capstan 10 to again establish the pinch OFF state. As the control motor 16 is driven further in the reverse direction, the tape guide assemblies 6,6 and the pinch roller 11 are returned to the pre-loading positions thereof, as shown on FIG. 1.

It will be appreciated from the foregoing that the present invention provides a magnetic recording and reproducing apparatus wherein the single control motor 16 is used for driving the rotary members 17,17 and thereby controlling the operation of the tape guide assemblies 6,6 and the pinch roller 11, thus assuring a simpler construction with reduction in the number of component parts and the overall size, and facilitating the assembling operation.

Since the operations of the pinch roller 11 and the tape guide assemblies 6,6 are controlled by the single control motor, the operation of these component parts is coordinated and the possibility of troubles or malfunctions is eliminated, with the result that reliability is improved.

Although an illustrative embodiment of the invention has been described in detail herein with reference to the accompanying drawings, it is to be understood that the invention is not limited to that precise embodiment and that various changes and modifications could be effected therein by one skilled in the art without departing from the scope or spirit of the invention as defined in the appended claims.

What is claimed is:

1. A cassette-type magnetic tape recording and/or reproducing apparatus comprising:
   a rotary drum unit having magnetic head means for recording or reproducing signals on a magnetic tape on the peripheral surface of said drum;
   a loading device including tape guide means, means mounting said tape guide means for limited movements in predetermined paths between first positions in which said tape guide means are engageable with the magnetic tape within a cassette, and second positions in which said tape guide means withdraw the tape from the cassette and guide the withdrawn tape about at least a portion of said peripheral surface of the drum whereat said magnetic head means can record or reproduce signals thereon, rotary ring means, a single reversible electric motor coupled with said rotary ring means for selectively turning the latter in opposed loading and unloading directions, and connecting means extending between said ring means and said tape guide means and causing said tape guide means to move with said ring means between said first and second positions in response to said turning of the ring means in said loading and unloading directions, said connecting means including yieldable means which yield upon further turning of said ring means in said loading direction after said tape guide means have completed said limited movements to said second positions;
   a capstan adapted to be rotatably driven;
   a pinch roller;
   means supporting said pinch roller for movement between an engaged position in which said pinch roller is pressed against said capstan with the tape therebetween, and a disengaged position in which said pinch roller is separated from the capstan; and
   actuating means mounted on said rotary ring means and engageable with said means supporting the pinch roller to cause movement of said pinch roller to said engaged position pressed against said capstan in response to said further turning of said rotary ring means in said loading direction.

2. A cassette-type magnetic tape recording and/or reproducing apparatus comprising:
   a rotary drum unit having magnetic head means for recording or reproducing signals on a magnetic tape on the peripheral surface of said drum;
   a loading device including tape guide means, means mounting said tape guide means for limited movements in predetermined paths between first positions in which said tape guide means are engageable with the magnetic tape within a cassette, and second positions in which said tape guide means withdraw the tape from the cassette and guide the withdrawn tape about at least a portion of said peripheral surface of the drum whereat said magnetic head means can record or reproduce signals thereon, rotary ring means, a single reversible electric motor coupled with said rotary ring means for selectively turning the latter in opposed loading and unloading directions, and connecting means extending between said ring means and said tape guide means and causing said tape guide means to move with said ring means between said first and second positions in response to said turning of the ring means in said loading and unloading directions, said connecting means including yieldable means which yield upon further turning of said ring means in said loading direction after said tape guide means have completed said limited movements to said second positions;

a capstan adapted to be rotatably driven;

a pinch roller;

means supporting said pinch roller for movement between an engaged position in which said pinch roller is pressed against said capstan with the tape therebetween, and a disengaged position in which said pinch roller is separated from the capstan; and actuating means mounted on said rotary ring means and engageable with said means supporting the pinch roller to cause movement of said pinch roller to said engaged position pressed against said capstan in response to said further turning of said rotary ring means in said loading direction;

in which said connecting means further includes arm means pivotally connected, at one end, to said tape guide means, and follower pin means at the other end of said arm means; and in which said rotary ring means has arcuate slot means therein slidably receiving said follower pin means, and said yieldable means is in the form of tension spring means urging said follower pin means against one end of said arcuate slot means.

3. A cassette-type magnetic tape recording and/or reproducing apparatus according to claim 2; in which said actuating means includes an actuating member mounted on said rotary ring means for limited movements relative to the latter in said loading and unloading directions and engageable with said means supporting the pinch roller, and second tension spring means connected between said rotary ring means and said actuating member for yieldably urging the latter to the limit of said movements thereof relative to said ring means in said loading direction, said second tension spring means being loaded upon said movement of the pinch roller to said engaged position for providing the force with which said pinch roller is pressed against said capstan.

4. A cassette-type magnetic tape recording and/or reproducing apparatus according to claim 3; in which said means supporting the pinch roller includes a support arm which is pivotally mounted adjacent one end and which rotatably supports said pinch roller at a distance from said one end, said support arm being biased in a direction moving said pinch roller away from said capstan, and an actuating pin extending from said support arm; and in which said actuating member has a nose portion extending radially in respect to said ring means and coming to bear against said actuating pin upon said turning in the loading direction.

5. A cassette-type magnetic tape recording and/or reproducing apparatus according to claim 1; in which said means mounting the tape guide means includes a chassis having a slot therein for each of said tape guide means and along which the latter is directed in the respective path, and a control block situated on said chassis adjacent the end of said slot corresponding to said second position of the respective tape guide means and against which said tape guide means is urged by said yieldable means in response to said further turning of said ring means in said loading direction, whereby said control bock positionally stabilizes the tape guide means urged thereagainst.

* * * * *

UNITED STATES PATENT AND TRADEMARK OFFICE
CERTIFICATE OF CORRECTION

PATENT NO. : 4,777,546

DATED : October 11, 1988

INVENTOR(S) : Tsuyoshi Nagasawa et al.

It is certified that error appears in the above-identified patent and that said Letters Patent is hereby corrected as shown below:

Column 7, line 21, change "cocntrol" to --control--.

IN THE CLAIMS

Column 10, line 36, change "bock" to --block--.

Signed and Sealed this

Eighteenth Day of April, 1989

Attest:

DONALD J. QUIGG

Attesting Officer

Commissioner of Patents and Trademarks